United States Patent [19]

Yamashita et al.

[11] 4,454,438
[45] Jun. 12, 1984

[54] SYNCHRONIZED INDUCTION MOTOR

[75] Inventors: Seizi Yamashita, Katsuta; Kunio Miyashita, Hitachi; Syoji Tanabe; Tadao Shimotsu, both of Sakura, all of Japan

[73] Assignee: Hitachi, Ltd., Tokyo, Japan

[21] Appl. No.: 969,180

[22] Filed: Dec. 13, 1978

[30] Foreign Application Priority Data

Dec. 14, 1977 [JP] Japan .............................. 52/149356

[51] Int. Cl.³ ............................................ H02K 21/12
[52] U.S. Cl. .................................. 310/162; 310/211; 310/163; 310/156
[58] Field of Search ..................... 310/156, 162–165, 310/211, 261, 262

[56] References Cited

U.S. PATENT DOCUMENTS

| | | | |
|---|---|---|---|
| 2,019,683 | 11/1935 | Kohlhagen | 310/163 |
| 3,891,879 | 6/1975 | Yamada et al. | 310/156 X |
| 3,909,647 | 9/1975 | Peterson | 310/156 |
| 3,968,390 | 7/1976 | Yasuda et al. | 310/156 |
| 4,139,790 | 2/1979 | Steen | 310/156 |
| 4,144,469 | 3/1979 | Miyashita | 310/156 |

Primary Examiner—Donovan F. Duggan
Attorney, Agent, or Firm—Antonelli, Terry & Wands

[57] ABSTRACT

A synchronized induction motor comprises a stator including a cylindrical armature core having an armature winding wound thereon for generating a rotating magnetic field, a cylindrical housing for housing the stator therein, end brackets mounted at opposite open ends of the housing and having a bearing mounted at a center portion thereof a rotor shaft concentrically arranged in the stator axially of the armature core and rotatably supported by bearings, a rotor core mounted concentrically with the rotor shaft on the rotor shaft and magnetically coupled to the armature core through an air gap, end plates mounted to sandwich the rotor core, starting secondary conductors arranged axially of the rotor shaft in the vicinity of an outer circumference of the rotor core and adapted to cooperate with the stator which is held by the end plate to form an induction motor, end rings for shorting the ends of the secondary conductors on the end plates, balance rings mounted on the rotor shaft in the vicinity of the bearings, sumarium-cobalt split-type permanent magnets arranged around the outer circumference of the rotor core axially of the rotor shaft, and an epoxy fiber impregnated glass fiber tape or stainless steel tape for holding the permanent magnets on the rotor core. The permanent magnets are magnetized after they have been mounted on the rotor core.

1 Claim, 5 Drawing Figures

SYNCHRONIZED INDUCTION MOTOR

BACKGROUND OF THE INVENTION

1. Field of the Invention

The present invention relates to a self-starting synchronized induction motor using a permanent magnet rotor.

The synchronized induction motor of the present invention may be used, for example, in a winding system in a spinning plant.

2. Description of the Prior Art

In the winding system in a spinning plant, since a plurality of synchronized induction motors are arranged in parallel and driven in synchronism, the motors should not be of external starting type but they should be of self-starting type and also they should be able to pull in a large load inertia.

Heretofore, in the electric motor of this type, a special rotor which operates as an induction motor at the start of the motor and can be operated as a synchronous motor while making use of a permanent magnet of the rotor after pull-in has been used.

A structure of the permanent magnet rotor is disclosed, for example, in U.S. Pat. No. 3,967,827. In the rotor of the U.S. Patent, a ring-shaped permanent magnet assembly having magnetic poles on the periphery is fitted to one end of a conventional cage rotor. In this type of synchronized induction motor, when the rotor speed approaches a synchronous speed, the rotor constitutes an induction motor together with a stator. Therefore, no substantial current flows into a secondary conductor and about 80% of total fluxes pass through the rotor of the induction motor while only about 20% of total fluxes pass through the ring permanent magnet. Consequently, it is difficult to attain a synchronized induction motor of large capacity such as 100 watts or higher.

A large capacity synchronized induction motor of 100 watts or higher is disclosed in the Japanese Utility Model Application Laid-Open No. 114,612/76 entitled "A Rotor of a Magnet Type Synchronous Machine". In the rotor of this application, a number of cage secondary conductors are embedded in the vicinity of an outer surface of a rotor core, magnets are incorporated inside the rotor core, and slits for preventing the short of magnetic fluxes of the permanent magnets when the motor is operated as a synchronous motor are radially formed in a magnet housing. In this type of synchronized induction motor, when the rotor speed approaches the synchronous speed, most fluxes do not pass through the slits but pass through the permanent magnet. Consequently, a large capacity motor can be attained and the drawback encountered in the synchronized induction motor disclosed in the U.S. Pat. No. 3,967,827 is overcome.

As described above, this type of synchronized induction motor is used in spinning machines or the like, and in that case, a number of such motors are powered from a power supply such as an inverter having a fixed frequency and driven in synchronism. When such motors are used in spinning machine, the speed of the spinning machines is proportional to a speed of a roll directly coupled to the synchronized induction motors. In order to optimize manufacture it is desirable to increase the speed of the motors. If the speed of the motors is doubled, a yield of the system can be doubled, and for a given yield the scale of the system can be reduced to one half. For this reason, it is required that the synchronized induction motor have enough strength to withstand high speed operation. The structure shown in the Japanese Utility Model Application Laid-Open No. 114,612/76 suffers from a limitation to the above requirement.

Namely, firstly, since the permanent magnets are housed in the core, slits for preventing the short of the magnetic fluxes of the permanent magnet are necessary. Consequently, the strength of the core cannot be high enough and hence the speed of the synchronized induction motor cannot be increased greatly.

Secondly, a problem in increasing the speed resides in the need of increasing a danger speed of the rotor which is a rotational speed corresponding to a primary resonance frequency of a bearing span of a rotor shaft. In order to raise the danger speed of the rotor, a diameter of the rotor shaft need be increased. In this case, a sectional area of the core defined between a starting secondary conductor which, together with a stator, constitute the induction motor and the rotor shaft, that is, a sectional area of core back is decreased. As a result, a magnetic circuit is apt to be saturated at the start of the synchronized induction motor and a starting current increases.

SUMMARY OF THE INVENTION

It is an object of the present invention to provide a synchronized induction motor which minimizes a starting current.

It is another object of the present invention to provide a synchronized induction motor which is mechanically strong enough to withstand high speed operation.

In order to achieve the above objects, according to the present invention, permanent magnets are arranged axially of a rotor shaft around an outer circumference of a rotor core, with the permanent magnets having a coercive force such that the magnet is not demagnetized by rotating magnetic field of the air gaps when the motor operates as an induction motor. With the arrangement of the present invention, the slits for preventing the short of the magnetic fluxes of the permanent magnets are not necessary. As a result, the core back sectional cures can be increased and the magnetic circuit will not be saturated and hence the starting current can be reduced. Furthermore, since the slits for preventing the short of the magnetic fluxes of the permanent magnets are not necessry in the present invention, a higher rotor breakdown speed can be established and a structure suited for a high speed synchronized induction motor can be attained.

DESCRIPTION OF THE PREFERRED EMBODIMENTS

Figure 1:
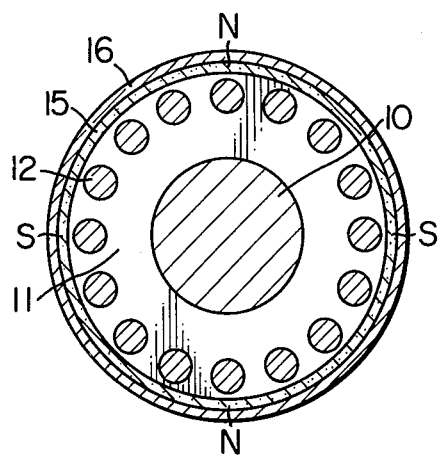
FIG. 1 is a cross sectional view of a rotor of a synchronized induction motor in accordance with a preferred embodiment of the present invention, in which the rotor is cut perpendicularly to an axial direction of the rotor.
Figure 2:
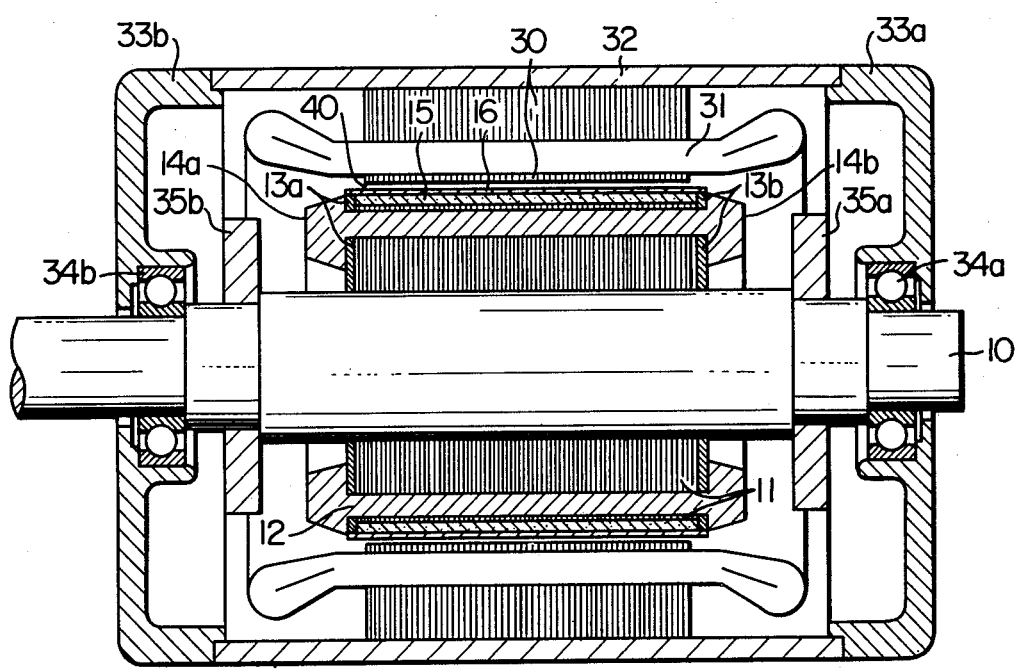
FIG. 2 is a longitudinal sectional view of the rotor and a stator of the synchronized induction motor of the preferred embodiment of the present invention, in which the rotor and the stator are cut axially.

FIG. 1 shows a cross sectional view of a rotor in accordance with a preferred embodiment of the present invention, and FIG. 2 shows a longitudinal sectional view of the rotor and a stator of the preferred embodiment of the present invention. In FIG. 2, numeral 30 denotes an armature core and numeral 31 denotes an armature winding for generating a rotating magnetic field in the armature core 30. A stator having the armature core 30 and the armature winding 31 is fixed inside a cylindrical housing 32, opposite open ends of which are covered with end brackets 33a and 33b. A rotor shaft 10 is coaxially arranged along an axis of the armature core 30. The rotor shaft 10 is rotatably supported by bearings 34a and 34b mounted to the end brackets 33a and 33b. Numeral 11 denotes a rotor core which is coaxially mounted on the rotor shaft 10 and magnetically coupled to the armature core 30 through an air gap 40. Numeral 12 denotes cage secondary conductors which extend through end plates 13a and 13b mounted in the vicinity of the outer circumference of the rotor core 11 to sandwich the rotor core 11. Numerals 14a and 14b denote end rings for shorting the ends of the secondary conductors 12. Numeral 15 denotes a cylindrical permanent magnet which is made of high coercive force samarium-cobalt (Sm-Co) and fitted around the outer circumference of the rotor core 11. Numeral 16 denotes a cylindrical reinforcing member fitted around the outer circumference of the magnet 15. The opposite ends of the magnet 15 and the reinforcing member 16 are held by the end plates 13a and 13b. As shown in FIG. 1, the magnet 15 is magnetized after it has been mounted. Numerals 35a and 35b denote balance rings mounted on the rotor shaft 10 in the vicinity of the end brackets 33a and 33b, and they serve to dynamically balance the rotor.

The synchronized induction motor having the rotor described above operates an an induction motor at the time of the start of the motor by the function of the rotating magnetic field of the air gap of the stator and the secondary conductors of the rotor, and after the pull-in, it operates as a synchronous motor by the function of the rotating magnetic field of the air gap of the stator and the permanent magnet 15 on the outer circumference of the rotor.

The permanent magnet 15 is preferably made of a material having a coercive force iHc of higher than 15 K oersteds for the following reason. Namely, when the synchronized induction motor operates as the induction motor, the magnetic flux at the air gap 40 is expelled to the external of the secondary conductors 12. (This is referred to as a magnetic shield effect of the cage induction motor.). Accordingly, the magnetic flux generated, when the motor operates as an induction motor, directly passes through the permanent magnet 15 mounted around the rotor core 11. Unless a magnetic flux density when a current flows in the secondary conductors 12 is around 10,000 Gausses at a tooth position of the rotor between two adjacent secondary conductors, a sufficient starting torque and synchronizing torque cannot be attained. When a magnetic flux on the outer circumference of the secondary conductors 12, that is, on the outer circumference of the rotor core 11 is 7,000 Gausses, and the permanent magnet 15 has a remanence magnetic field density Br of 8,000 Gauss and a permeability $\mu$ of 1, a subtractive magnetic field of 15,000 oersteds at maximum is applied to the permanent magnet 15. In the next half cycle of an A.C. voltage applied to the armature winding, an additive magnetic field is applied to the permanent magnet 15. Accordingly, in the above case, the permanent magnet 15 must have a corecive force of 15 K oersteds. So long as the above requirement is met, the permanent magnet 15 may be made of any material. It is convenient to use Sm-Co for the permanent magnet because it has highest coercive force iHc and relatively easily available among high coercive force materials.

A rare earth-cobalt magnet may be used as a high corecive force permanent magnet. In an experiment, when Sm-Co is used for the permanent magnet 15 of the synchronized induction motor with P=1.0 kW, $GD^2=0.16$ Kgm$^2$, $T_{st}=10$ sec., pull-out torque=3 KW, pull-in torque=1.8 KW, rotor rotation speed=12,000 r.p.m. and rotor outer diameter=104 mm, a thickness of Sm-Co may be 1.5 mm, iHc may be 25 K oersteds and Br may be 8,000 gausses. The reinforcing member 16 may be a stainless ring having a thickness of 1.5 mm.

In the structure shown in FIGS. 1 and 2, since no other parts than the rotor shaft 10 and the secondary conductors 12 are required inside the rotor core 11, that is, since the permanent magnet need not be arranged inside the stator core as is needed in the Japanese Utility Model Application Laid-Open No. 114,612/76, the core back sectional area can be made large enough to prevent the saturation of the magnetic circuit and reduce the starting current. Furthermore, since the core back sectional area is large, deep groove cage conductors or double-cage conductors, which have been difficult to adopt in the prior art structure, can be readily adopted so that the synchronized induction motor with a small starting current and a high acceleration capability are provided. In this type of motor, it has been difficult in the prior art structure to assure a core back sectional area when the number of poles is small. In the present invention, this can be readily attained.

In the above embodiment, the gap length when the motor operates as the induction motor is substantially equal to a sum of the gap and the thicknesses of the permanent magnet 15 and the reinforcing member 16. Accordingly, one might consider that a larger exciting current would be required. According to an actual test, a starting current in the prior art synchronized induction motor having the slits in the rotor core is about 30 times as high as a rated current. However, according to an experiment of the present invention, the starting current is less than 20 times as high as the rated current. Accordingly, in the present invention, the increase of the exciting current due to the thicknesses of the permanent magnet 15 and the reinforcing member 16 is of no importance.

Furthermore, according to the present embodiment, the synchronized induction motor having an enough strength to withstand the high speed operation can be provided for the following two reasons.

First, since no slit is formed in the rotor core 11 of the present structure, the rotor strength is much higher than the prior art rotor having the slits in the rotor core, and hence no reinforcing member such as a reinforcing pin need be provided in the rotor core.

Second, since no permanent magnet is arranged inside the rotor core 11 of the present invention unlike the rotor core of the prior art synchronized induction motor, the diameter of the rotor shaft 10 can be increased. Accordingly, a higher shaft danger speed may be set and a structure suitable for high speed motor can be provided. In order to increase the speed of the motor, it is necessary to increase the rotor danger speed. In the prior art rotor of more than 100 watts capacity having a magnet, If the diameter of the rotor shaft is increased, the sectional area of the secondary conductors necessarily decreases, which leads to the reduction of the synchronizing torque. Consequently, for a large load inertia, the synchronization is difficult to attain. In addition, when the diameter of the rotor shaft is increased, the sectional area of the magnet decreases, which leads to the reduction of the output in the synchronous operation and the reduction of power factor. Therefore, the diameter of the shaft cannot be increasec greatly. On the other hand, in the present structure in which no permanent magnet is contained inside the rotor core, the sectional areas of the secondary conductors 12 and the permanent magnet 15 are not reduced even if the diameter of the rotor shaft is increased. Therefore, the diameter of the rotor shaft can be increased relatively easily so that the shaft danger speed can be increased and the structure suitable for high speed motor can be attained.

Furthermore, in accordance with the present embodiment, since the permanent magnet 15 is arranged around the outer periphery of the rotor, the magnetic flux generating sectional area of the permanent magnet 15 can be increased and hence the amount of magnetic flux emitted from the magnet can be increased. Therefore, according to the present invention, the output in the synchronous operation can be increased and the power factor can be raised.

Furthermore, according to the illustrated structure, the motor size can be reduced because the rotor of the illustrated structure can increase the core back sectional area and increase the sectional area of the magnet. In an experiment, when the structure of the present invention is used to attain the same output as is provided by a motor having a rotor of a prior art structure with a diameter of 105 mm and a length of 155 mm, a small-size rotor having a diameter of 80 mm and a length of 80 mm is sufficient.

Furthermore, in the structure of the present embodiment, when the number of poles is to be changed, only the number of magnetizing points of the magnet need be changed without changing a blanking die for the rotor core. Therefore, the assembling work is easy and the reinforcing member 16 need only function to hold the magnet 15. In a 12,000 r.p.m. motor, for example, a stainless steel plate of 1.5 mm thickness is sufficient. In addition, since the permanent magnet need not be fitted in the rotor core as is done in the prior art rotor, the blanking die for the rotor core may be simple and hence the synchronized induction motor which is cheaper, as a whole, than the prior art motor can be provided.

Furthermore, in accordance with the structure of the present invention, since no slit for blocking the magnetic flux is formed in the rotor core, the permeance of the rotor does not change from rotating position to rotating position of the rotor. Therefore, the pulsation of a primary current is reduced and the effect upon the components such as inverter connected between the terminals of the stator is reduced.

Furthermore, in accordance with the present invention, since the starting current is reduced, the components such as the inverter may be of small capacity and hence the cost for the facilities can be reduced.

Figure 3:
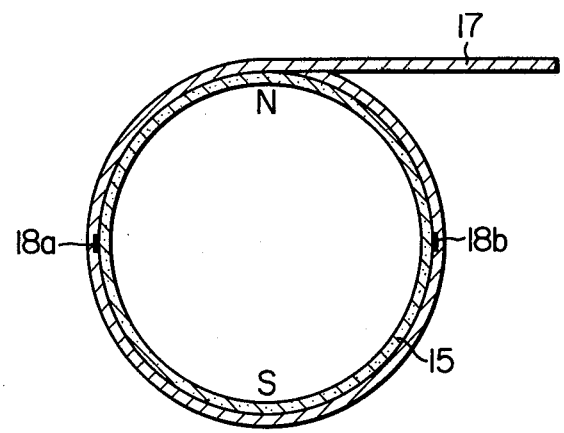
FIG. 3 shows a mounting method of a magnet reinforcing member in accordance with the present invention.

In FIG. 3, a reinforcing member is made of a web-like plate member 17 instead of the stainless steel ring. The ring-shaped permanent magnet 15 is mounted on the outer circumference of the rotor core 11 (not shown in FIG. 3), and the plate member 17 is wound around the outer circumference of the permanent magnet 15 to hold the magnet 15. With this structure, the assembly work is easy and automatic asssembly of the synchronized induction motor is facilitated. The plate member 17 is preferably welded to the permanent magnet 15 intermediate the magnetic poles, that is, at intermediate points 18a and 18b of N and S poles, because the deterioration of the characteristic of the magnet will not raise a significant problem when the interpole points are welded while the characteristic of the magnet changes as the temperature of the magnet rises by welding because layer transition of the material takes place.

Figures 4, 5:
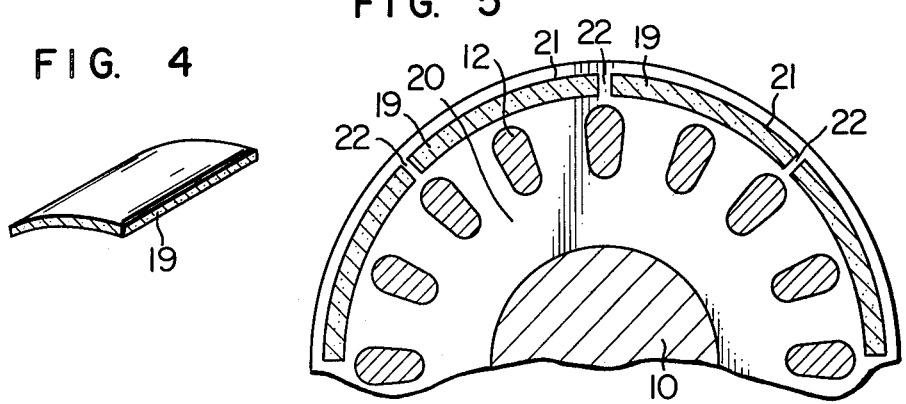
FIG. 4 shows an embodiment of a permanent magnet in accordance with the present invention.
FIG. 5 shows a cross sectional view of a rotor in accordance with another embodiment of the present invention.

A split-type magnet comprising arcuate magnets 19 shown in FIG. 4 may be used in place of the ring-shaped permanent magnet 15. The split-type magnet is easier to manufacture than the ring-shaped magnet. In order to mount the split-type permanent magnet 19 around the outer circumference of the rotor core 11, a tape made of epoxy resin impregnated glass fiber is used as the reinforcing member 16 and the split-type permanent magnet 19 is bound on the rotor core 11 by the tape. Alternatively, a stainless steel may be used as the reinforcing member 16.

For an application where certain deterioration of performance is allowed in the starting time and the synchronizing torque, a rotor structure as shown in FIG. 5 may be used. Namely, a plurality of axial bores 21 each having an arcuate cross section and extending axially with a substantial length are formed in the outer circumference of the rotor core 20, and the arcuate magnets 19 as shown in FIG. 4 are inserted in the bore 21. With this structure, since the magnetic fluxes generated by the magnets 19 are shorted by portions 22 of the core between adjacent magnets, the amount of available magnetic flux is reduced but the reinforcing material 16 shown in FIGS. 1 and 2 is not necessary. Accordingly, the manufacturing process can be simplified.

In the present invention, the number of poles of the motor and the shape of the secondary conductors may be arbitrarily selected.

What is claimed is:
1. A synchronized motor comprising:
(a) a stator including an armature core having an armature winding wound thereon for generating a rotating magnetic field;
(b) a casing for housing said stator;
(c) a rotor shaft concentrically arranged axially of said armature core;
(d) a rotor core mounted concentrically with said rotor shaft on said rotor shaft and magnetically coupled to said armature core through an air gap;
(e) starting secondary conductors arranged within said rotor core, said secondary conductors and said stator forming an induction motor;
(f) a permanent magnet mounted in the outer circumference of said rotor core along the axis of said rotor shaft for forming a synchronous motor in cooperation with said stator, said permanent magnet having a predetermined coercive force such that the permanent magnet is not demagnetized by a rotating magnetic field in the air gap generated when the motor is operating as the induction motor, said permanent magnet having the coercive force of no less than 15 K oersteds; and
(g) a reinforcing member mounted around an outer circumference of said permanent magnet, said reinforcing member being welded to said permanent magnet at interpole points.

* * * * *